P. J. R. POSTEL-VINAY.
JUNCTION PIECE FOR CONNECTING TOGETHER CERTAIN STRUCTURAL MEMBERS OF AEROPLANES.
APPLICATION FILED DEC. 19, 1918.

1,345,024.

Patented June 29, 1920.
6 SHEETS—SHEET 1.

Inventor
Pierre Jean René Postel-Vinay
By Laurence Langner.
Attorney

UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTEME CANTON-UNNE), OF BILLANCOURT, FRANCE.

JUNCTION-PIECE FOR CONNECTING TOGETHER CERTAIN STRUCTURAL MEMBERS OF AEROPLANES.

1,345,024.  Specification of Letters Patent.  Patented June 29, 1920.

Application filed December 19, 1918. Serial No. 267,547.

*To all whom it may concern:*

Be it known that I, PIERRE JEAN RENÉ POSTEL-VINAY, citizen of the Republic of France, residing at 46 Boulevard de La Tour-Maubourg, Paris, Seine, in the Republic of France, have invented new and useful Improvements in Junction-Pieces for Connecting Together Certain Structural Members of Aeroplanes, of which the following is a specification.

This invention has for its object to provide an improved junction piece for aeroplanes, designed for connecting together a longitudinal, a fuselage strut, a cabin stanchion, a wing longeron and a corresponding strut of the landing carriage.

The improved junction piece has the form of a box; it is also provided with lugs for the attachment of the stay wires. It provides a strong means of connection that can be fixed very simply. By its attachment to the landing carriage struts it enables the strains due to landing to be taken by the same parts that take the strains due to flying.

The accompanying drawings illustrate by way of example a constructional form of this invention.

Figure 1:
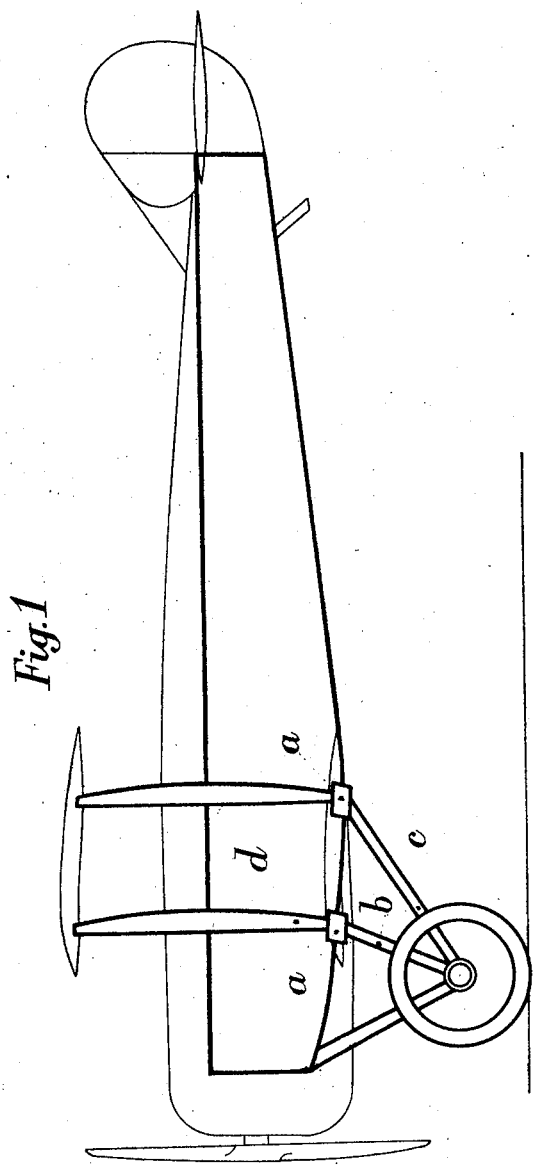
Figure 1 is a diagrammatic side elevation of an aeroplane showing the location of two improved junction pieces.
Figure 2:
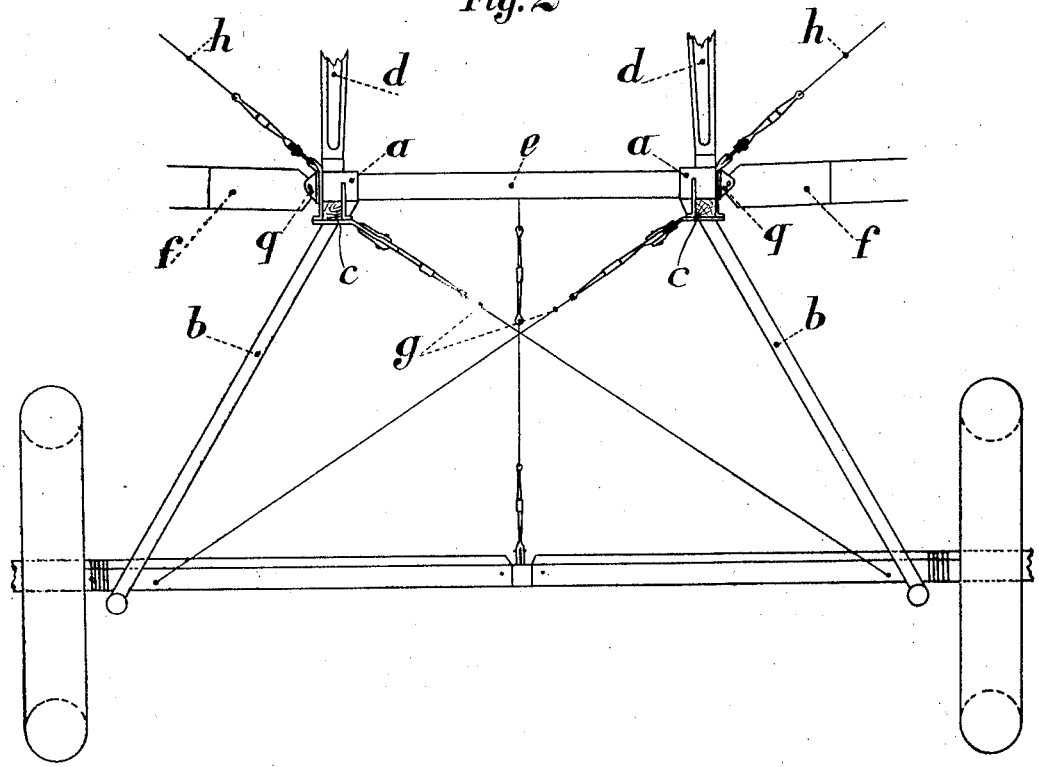
Fig. 2 is a partial front end elevation of a landing carriage, showing the connections made by means of the two improved junction pieces.
Figure 3:
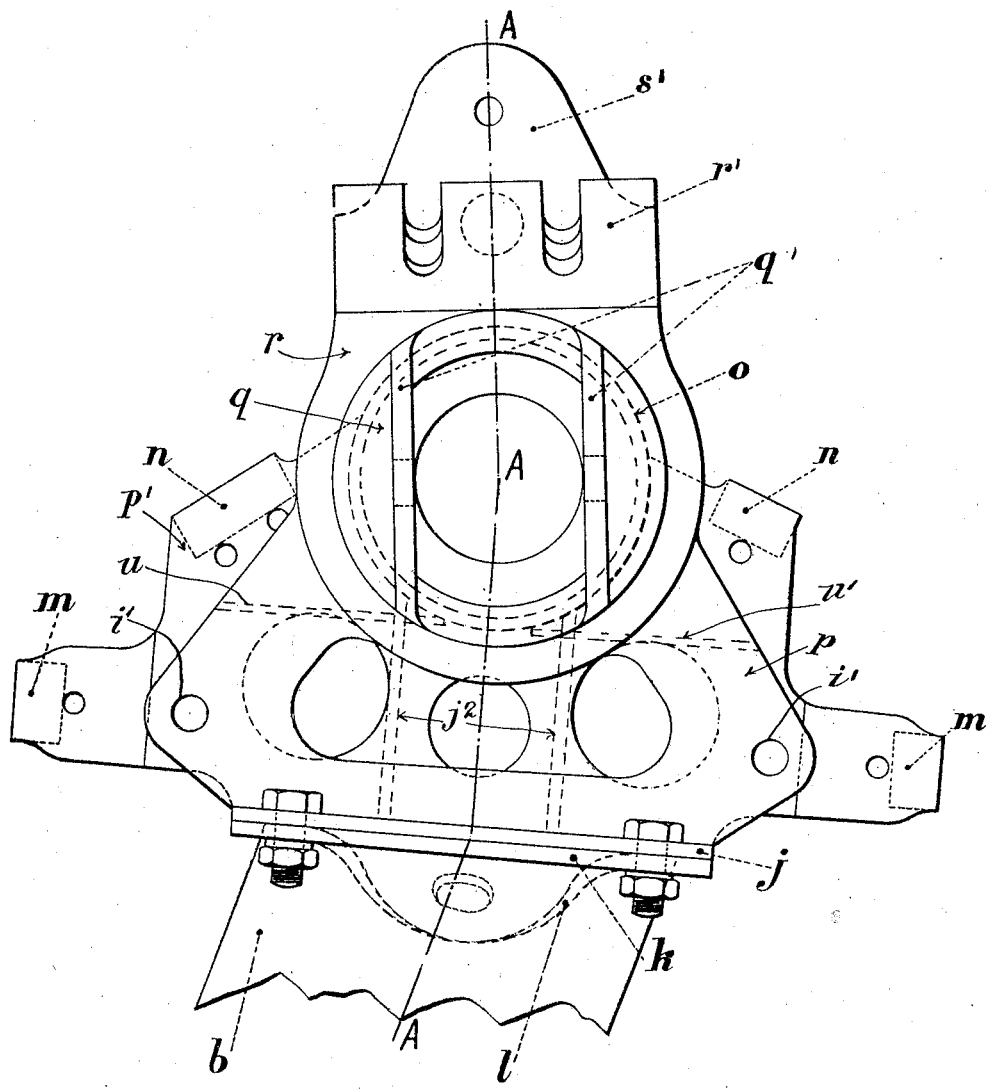
Figs. 3, 4 and 5 are respectively an end elevation, a section on the line A—A of Fig. 3, and a plan of an improved junction piece.

It will be perceived from Figs. 1 and 2 that the junction pieces $a$ are arranged at the junction of the landing carriage struts $b$, the fuselage longitudinals $c$ and the cabin stanchions $d$. These junction pieces receive also the fuselage struts $e$ and the wing longerons $f$.

They are also formed with lugs for the attachment of the landing carriage stay wires $g$ and the cell stay wires $h$.

Figure 4:
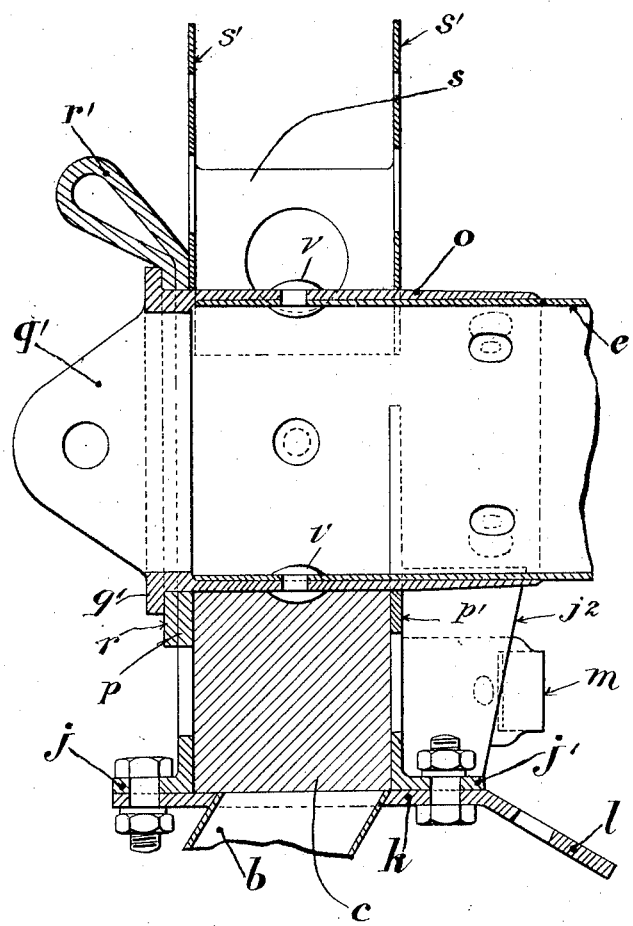
Figure 5:
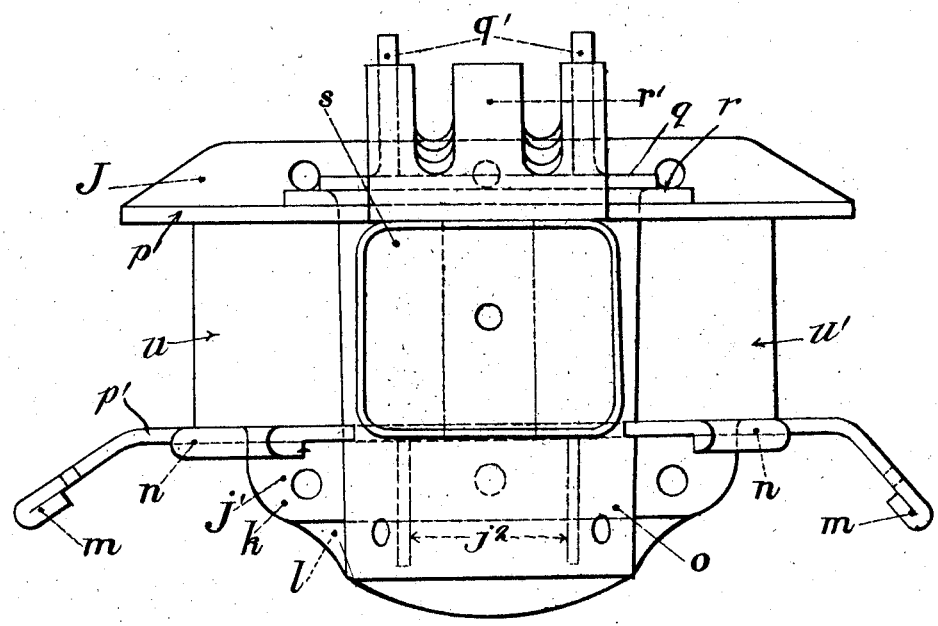
Figure 6:
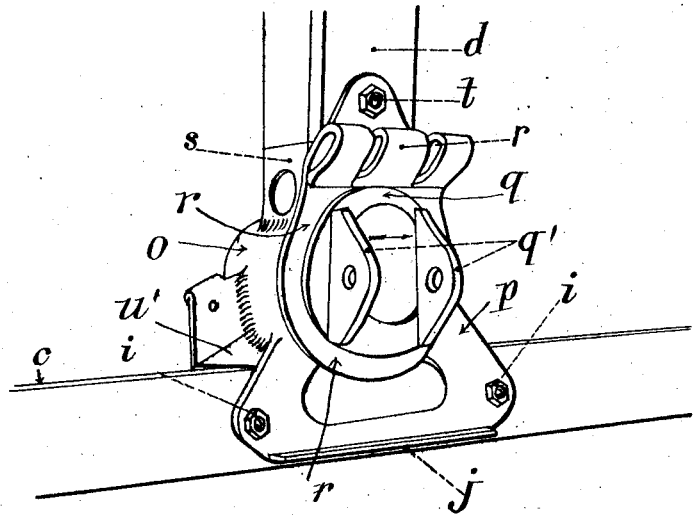
Figs. 6 and 7 are two perspective views of the improved junction piece taken from two opposite ends of the same. In these two views it is assumed that only a fuselage longitudinal and a cabin stanchion are mounted in position.
Figure 7:
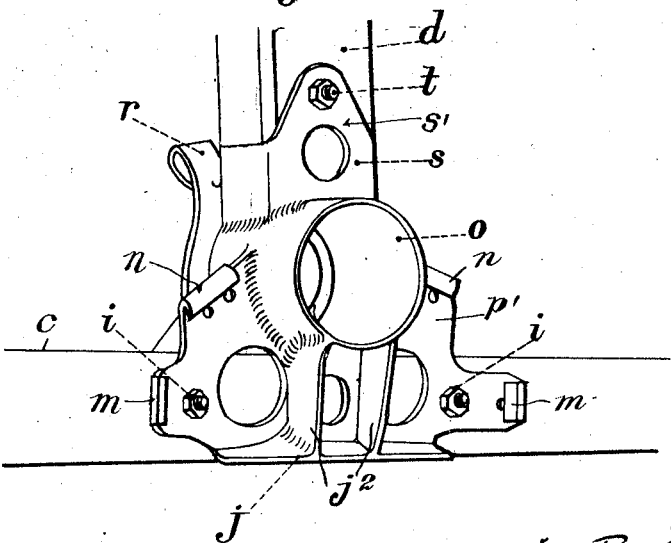

The improved junction piece or fitting comprises a central forged steel sleeve $o$ which is carefully bored to the desired diameter so that the transverse strut $e$ of the fuselage may be adjusted and riveted therein as shown at $v$ (Fig. 4), the riveting taking place however only after the whole junction piece has been constructed. To the central sleeve $o$ are welded two lower vertical side pieces $p$ $p^1$ and two horizontal strut plates $u$ $u^1$ extending between the side members $p$ $p^1$ so as to form a horizontal channel open at its bottom face, in which the fuselage longitudinal $c$ is received. The side plates $p$ $p^1$ are provided with holes $i^1$ through which extend bolts $i$ which extend also through the longitudinal and hold firmly the clip in position on the latter. The side plates $p$ $p^1$ are formed at their lower parts with two flanges $j$ $j^1$ respectively to which is bolted a strap $k$ rigidly secured to the corresponding strut $b$ of the landing carriage. The flange $j^1$ is connected to the central sleeve $o$ by vertical webs $j^2$ welded at both ends.

The strap $k$ has a lug $l$ for the attachment of the stay wires $g$. The inner wall $p^1$ of the junction piece has lugs $m$ and $n$ for the attachment of other stay wires.

To the outer end of the central sleeve $o$, is welded a ring plate or flange $q$ provided with two vertical lugs $q^1$ between which the wing longeron $f$ is inserted.

A metal plate $r$ is placed around the sleeve $o$ between the side plate $p$ and the flange $q$ and welded to the parts $o$ and $p$; the upper part of said plate is turned over so as to form a lug $r^1$ which serves for the attachment of the cell stay wires $h$.

The cabin stanchion $d$ is fitted into a rectangular socket $s$ formed of a metal plate suitably bent and welded. Said socket is welded at its lower end upon the central sleeve $o$. The cabin stanchion $d$ is secured in said socket by means of a bolt $t$ extending through two opposite lugs $s^1$ integral with the socket.

The junction piece is lightened by the provision of recesses in its walls as shown.

Having now described my invention, what I claim as new and desire to secure by Letters Patent is:

1. A junction piece for aeroplane members comprising a central sleeve part in which a cross member of the fuselage is adapted to be riveted, opposite lower vertical plates and horizontal truss plates welded to said sleeve and forming a channel adapted to receive a fuselage longitudinal, means carried by the corresponding strut of the landing carriage and adapted to be secured to said lower vertical plates, bolts extending through said plates and the fuselage longitudinal, a socket member for a vertical stanchion welded upon the said central sleeve and a lug carrying plate welded to the end of the central sleeve and adapted to receive a wing beam.

2. A junction piece for aeroplane members comprising a central sleeve part, in which a cross member of the fuselage is adapted to be riveted, opposite lower vertical plates and horizontal truss plates welded to said sleeve and forming a channel adapted to receive a fuselage longitudinal, means carried by the corresponding strut of the landing carriage and adapted to be secured to said lower vertical plates, bolts extending through said plates and the fuselage longitudinal, a socket member for a vertical stanchion welded upon the said central sleeve, a lug carrying flange welded to the end of the central sleeve and adapted to receive a wing longitudinal, a plate inserted between said flange on one side and one of the lower vertical plates and the socket member on the other side, about the central sleeve, said plate being welded to the adjacent parts and a lug made integral with said plate for the attachment of stay wires.

In testimony whereof I have signed my name to this specification.

PIERRE JEAN RENÉ POSTEL-VINAY.